(12) United States Patent
Linåker et al.

(10) Patent No.: US 11,151,740 B2
(45) Date of Patent: Oct. 19, 2021

(54) SIMULTANEOUS LOCALIZATION AND MAPPING (SLAM) DEVICES WITH SCALE DETERMINATION AND METHODS OF OPERATING THE SAME

(71) Applicant: SONY GROUP CORPORATION, Tokyo (JP)

(72) Inventors: Daniel Linåker, Lund (SE); Mattias Walls, Häljarp (SE); Johannes Elg, Helsingborg (SE); Fredrik Olofsson, Lund (SE); Fredrik Mattisson, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/634,824

(22) PCT Filed: Aug. 31, 2017

(86) PCT No.: PCT/US2017/049512
§ 371 (c)(1),
(2) Date: Jan. 28, 2020

(87) PCT Pub. No.: WO2019/045711
PCT Pub. Date: Mar. 7, 2019

(65) Prior Publication Data
US 2020/0211211 A1 Jul. 2, 2020

(51) Int. Cl.
*G06T 7/579* (2017.01)
*G06T 17/00* (2006.01)
(Continued)

(52) U.S. Cl.
CPC ............... *G06T 7/579* (2017.01); *G06T 7/70* (2017.01); *G06T 17/00* (2013.01);
(Continued)

(58) Field of Classification Search
CPC .... G06T 7/55–7/596; G06T 7/70–7/77; G06T 17/00–17/30; G06T 2207/10148; G06T 2207/30244; H04N 5/23212
See application file for complete search history.

(56) References Cited

U.S. PATENT DOCUMENTS

2010/0259594 A1  10/2010  Johansson et al.
2018/0261005 A1*  9/2018  Lin ........................ G06T 17/05

FOREIGN PATENT DOCUMENTS

EP   2854104 A1 *  4/2015  ............... G06T 7/77
EP   3182157        6/2017
(Continued)

OTHER PUBLICATIONS

R. Mur-Artal, J. M. M. Montiel and J. D. Tardós, "ORB-SLAM: A Versatile and Accurate Monocular SLAM System," in IEEE Transactions on Robotics, vol. 31, No. 5, pp. 1147-1163, Oct. 2015, doi: 10.1109/TRO.2015.2463671. (Year: 2015).*
(Continued)

*Primary Examiner* — Justin P. Misleh
(74) *Attorney, Agent, or Firm* — Myers Bigel, P.A.

(57) ABSTRACT

A method for determining the scale of a digital 3D model may include receiving, corresponding to a plurality of images, a respective plurality of first distances between the camera and the object in the environment and calculating, using a simultaneous localization and mapping (SLAM) algorithm, a plurality of second distances between the camera and the object in the 3D model of the environment. The method may include calculating a plurality of ratios corresponding to the plurality of images based on respective ones of the plurality of first distances and respective ones of the second distances and determining a scale of the 3D model based on the plurality of ratios. The method may include creating a scaled digital 3D model based on the 3 D model and the determined scale of the 3 D model. Distances and
(Continued)

sizes in the scaled 3D model may correspond to actual distances and sizes of the environment.

15 Claims, 4 Drawing Sheets

(51) Int. Cl.
   *H04N 5/232* (2006.01)
   *G06T 7/70* (2017.01)
(52) U.S. Cl.
   CPC .............. *H04N 5/23212* (2013.01); *G06T 2207/10148* (2013.01); *G06T 2207/30244* (2013.01)

(56) References Cited

FOREIGN PATENT DOCUMENTS

| WO | 2015/090420 | 6/2015 |
|---|---|---|
| WO | 2016/078728 | 5/2016 |

OTHER PUBLICATIONS

R. Mur-Artal and J. D. Tardos, "ORB-SLAM2: An Open-Source SLAM System for Monocular, Stereo, and RGB-D Cameras," in IEEE Transactions on Robotics, vol. 33, No. 5, pp. 1255-1262, Oct. 2017, doi: 10.1109/TRO.2017.2705103. (Year: 2017).*

Tomoyuki Shiozaki, "Scale Estimation for Monocular SLAM using Depth from Defocus," Centre for Autonomous Systems Faculty of Engineering and Information Technology University of Technology Sydney, Mar. 2018 (Year: 2018).*

International Search Report and Written Opinion of the International Searching Authority, International Application No. PCT/US2017/049512, dated Oct. 30, 2017, 9 pp.

Qiang et al., "Absolute Scale Estimation of ORB-SLAM Algorithm based on Laser Ranging", Proceedings of the 35th Chinese Control Conference, Chengdu, China, Jul. 27-29, 2016, pp. 10279-10283.

Davison et al., "MonoSLAM: Real-Time Single Camera SLAM", IEEE Transactions on Pattern Analysis and Machine Intelligence, vol. 29, No. 6, Jun. 2007, pp. 1052-1067.

Tateno et al., "CNN-SLAM: Real-time dense monocular SLAM with learned depth prediction", 2017 IEEE Conference on Computer Vision and Pattern Recognition (CVPR), Honolulu, HI, Jul. 21-26, 2017, pp. 6565-6574.

* cited by examiner

SIMULTANEOUS LOCALIZATION AND MAPPING (SLAM) DEVICES WITH SCALE DETERMINATION AND METHODS OF OPERATING THE SAME

CROSS REFERENCE TO RELATED APPLICATION

This application is a 35 U.S.C. § 371 national stage application of PCT International Application No. PCT/US2017/049512, filed on Aug. 31, 2017, the content of which is incorporated herein by reference in its entirety. The above-referenced PCT International Application was published in the English language as International Publication No. WO 2019/045711 A1 on Mar. 7, 2019.

TECHNICAL FIELD

Embodiments of the inventive concepts relate to image capture devices and, more particularly, to devices that implement simultaneous localization and mapping (SLAM) operations.

BACKGROUND

Simultaneous localization and mapping (SLAM) is a computational problem of constructing or updating a map of an unknown environment while simultaneously tracking a device's location within the environment. A SLAM device may use a series of observations from one or more cameras to perform a 3D reconstruction to compute the map of the environment, while simultaneously performing a camera pose estimation to determine an estimate of the device's location within the map of the environment.

Some SLAM devices may include at least two cameras that are physically separated a fixed distance apart from each other with a fixed physical orientation with respect to each other. Such SLAM devices may use the known fixed distance and orientation to calculate, based on differences between the views of the at least two cameras, a scale of the constructed map. In other words, SLAM devices that include at least two cameras may convert between distances and sizes of the constructed map and actual distances and sizes of the actual environment.

Some SLAM devices may use images from a single camera or may not know distances and/or orientations between more than one camera. In such SLAM devices, it may not be possible to determine a scale of the constructed map without further input. In other words, it may be possible to determine relative distances and sizes within the constructed map but it may not be possible to determine the relative actual distances and sizes of the actual environment without knowing the scale of the constructed map. For example, single camera SLAM calculations based on images of an object within a room may not be able to distinguish between a small object in a small room and a larger object in a larger room.

Some SLAM systems require that the measured environment must contain one or more target objects of known size. Measurements of the size of the target objects within the constructed map may be used to determine the scale of the constructed map. For example, a target object of a fixed size would appear larger next to the small object in the small room and would appear smaller next to the larger object in the larger room. However, for some SLAM systems and/or some environments, it may be desirable to determine the scale of the constructed map but it may not be convenient and/or possible to place the target objects of known size within the environment to determine the scale.

SUMMARY

According to some embodiments of the inventive concepts, devices may be provided. A device may include a camera, a processor, and a non-volatile memory coupled to the processor. The non-volatile memory may include computer readable program code. The computer readable program code may be executed by the processor. Executing the computer readable program code may cause the processor to perform operations. The operations may include controlling the camera to produce a plurality of images of an environment comprising an object. The operations may include receiving, corresponding to the plurality of images, a respective plurality of first distances between the camera and the object in the environment. The operations may include calculating, for the plurality of images, using a simultaneous localization and mapping (SLAM) algorithm, a plurality of second distances between the camera and the object in a digital 3-Dimensional (3D) model of the environment. The operations may include calculating a plurality of ratios corresponding to the plurality of images based on respective ones of the plurality of first distances and respective ones of the second distances. The operations may include determining a scale of the 3D model based on the plurality of ratios. The operations may include creating a scaled digital 3D model based on the 3D model and the determined scale of the 3D model. Distances and sizes in the scaled 3D model may correspond to actual distances and sizes of the environment.

Accordingly, some embodiments of the inventive concepts may determine a scale of a digital 3D model based on received distances to an object within the environment, and may not require more than one camera and/or require target objects of known size.

In some embodiments, the controlling of the camera to produce the plurality of images may include using an autofocus algorithm to control a focus of the camera. The receiving of the plurality of first distances may include receiving a plurality of focus distances from the autofocus algorithm.

In some embodiments, the plurality of images may be a first plurality of images. The operations may further include determining an actual distance from the camera to the object based on the scaled 3D model and controlling the camera to produce a second image using the actual distance to control a focus of the camera.

In some embodiments, the controlling of the camera to produce the plurality of images may include determining that at least a predetermined number of the plurality of images are acceptable and excluding images from the from the plurality of images that are not acceptable. The at least a predetermined number of the plurality of images may be determined to be acceptable based on at least one of: a determination that a location of the camera may be calculated; a determination that the object is within a view of each of the at least a predetermined number of the plurality images; and/or a determination that a difference between the location of the camera for ones of the at least a predetermined number of the plurality of images and a location of the camera for a previous acceptable image is greater than a threshold.

In some embodiments, the determining of the scale of the 3D model may include calculating an average of the plurality of ratios.

In some embodiments, the calculating of the average of the plurality of ratios may include: calculating a first average of the plurality of ratios; calculating a deviation from the first average for each of the plurality of ratios; and calculating a second average of ones of the plurality of ratios that deviate from the first average by less than a threshold value.

In some embodiments, the threshold value may be a predetermined multiple of a standard deviation of the plurality of ratios.

In some embodiments, the device may further include a Time of Flight (TOF) sensor that is configured to provide the plurality of first distances.

According to some embodiments, methods are provided. A method may include controlling a camera to produce a plurality of images of an environment including an object. The method may include receiving, corresponding to the plurality of images, a respective plurality of first distances between the camera and the object in the environment. The method may include calculating for the plurality of images, using a simultaneous localization and mapping (SLAM) algorithm, a plurality of second distances between the camera and the object in a digital 3-Dimensional (3D) model of the environment. The method may include calculating a plurality of ratios corresponding to the plurality of images based on respective ones of the plurality of first distances and respective ones of the second distances. The method may include determining a scale of the 3D model based on the plurality of ratios. The method may include creating a scaled digital 3D model based on the 3D model and the determined scale of the 3D model. Distances and sizes in the scaled 3D model may correspond to actual distances and sizes of the environment.

In some embodiments, the controlling of the camera to produce the plurality of images may include using an autofocus algorithm to control a focus of the camera. The receiving of the plurality of first distances may include receiving a plurality of focus distances from the autofocus algorithm.

In some embodiments, the plurality of images may be a first plurality of images. The operations may further include determining an actual distance from the camera to the object based on the scaled 3D model and controlling the camera to produce a second image using the actual distance to control a focus of the camera.

In some embodiments, the controlling of the camera to produce the plurality of images may include determining that at least a predetermined number of the plurality of images are acceptable and excluding images from the from the plurality of images that are not acceptable. The at least a predetermined number of the plurality of images may be determined to be acceptable based on at least one of: a determination that a location of the camera may be calculated; a determination that the object is within a view of each of the at least a predetermined number of the plurality images; and/or a determination that a difference between the location of the camera for ones of the at least a predetermined number of the plurality of images and a location of the camera for a previous acceptable image is greater than a threshold.

In some embodiments, the determining of the scale of the 3D model may include calculating an average of the plurality of ratios.

In some embodiments, the calculating of the average of the plurality of ratios may include: calculating a first average of the plurality of ratios; calculating a deviation from the first average for each of the plurality of ratios; and calculating a second average of ones of the plurality of ratios that deviate from the first average by less than a threshold value.

In some embodiments, the threshold value may be a predetermined multiple of a standard deviation of the plurality of ratios.

In some embodiments, the plurality of first distances may be received from a Time of Flight (TOF) sensor.

According to some embodiments, computer program products may be provided. A computer program product may include a non-transitory computer readable storage medium having computer readable program code embodied in the computer readable storage medium. The computer readable program code may be executed by a processor. Executing the computer readable program code may cause the processor to perform operations. The operations may include controlling a camera to produce a plurality of images of an environment comprising an object. The operations may include receiving, corresponding to the plurality of images, a respective plurality of first distances between the camera and the object in the environment. The operations may include calculating, for the plurality of images, using a simultaneous localization and mapping (SLAM) algorithm, a plurality of second distances between the camera and the object in a digital 3-Dimensional (3D) model of the environment. The operations may include calculating a plurality of ratios corresponding to the plurality of images based on respective ones of the plurality of first distances and respective ones of the second distances. The operations may include determining a scale of the 3D model based on the plurality of ratios. The operations may include creating a scaled digital 3D model based on the 3D model and the determined scale of the 3D model. Distances and sizes in the scaled 3D model may correspond to actual distances and sizes of the environment.

In some embodiments, executing the computer readable program code may cause the processor to perform any combination of operations of any of the method steps.

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed.

BRIEF DESCRIPTION OF THE DRAWINGS

The inventive concepts will be more clearly understood in view of the detailed description and the accompanying drawings.

DETAILED DESCRIPTION

Figure 1:
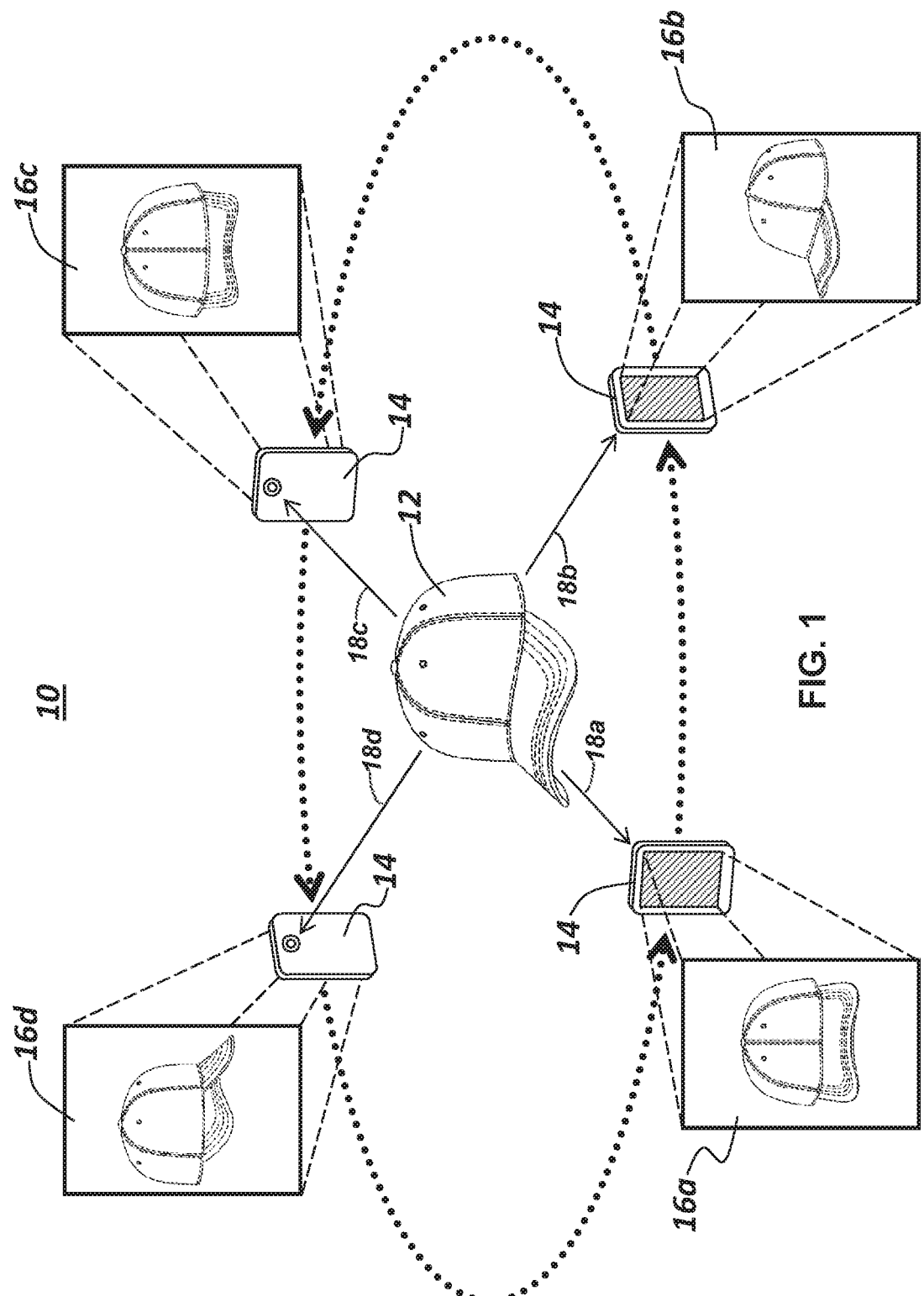
FIG. 1 is a perspective view of a device performing a simultaneous localization and mapping (SLAM) operation in an environment including a three-dimensional (3D) object, according to some embodiments of the inventive concepts.

Some embodiments of the inventive concepts will be described more fully herein with reference to the accompanying drawings. The inventive concepts may, however, be embodied in many different forms and should not be construed as being limited to the embodiments set forth herein. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Example embodiments are described herein with reference to block diagrams and/or flowchart illustrations of computer-implemented methods, apparatus (systems and/or devices) and/or computer program products. It is understood that any block within the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions, which implement the functions/acts specified in the block diagrams and/or flowchart block or blocks.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Applications such as 3D imaging, mapping, and navigation may use Simultaneous Localization and Mapping (SLAM). SLAM is the construction or updating of a map of an unknown environment while simultaneously tracking a device's location within it. This computational problem is recognized to be a chicken-and-egg problem since the device may be moving and the environment may be changing. In some SLAM systems, 2D images of real objects may be captured with the objective of creating a digital 3-Dimensional (3D) model that is used in real-world applications such as augmented reality, 3D printing, or 3D visualization with different perspectives of the real objects.

Simultaneous Localization and Mapping (SLAM) systems utilizing a plurality of cameras may determine a scale that converts from digital 3D model sizes and distances to actual sizes and distances based on a known fixed orientation and distance between the cameras. For single camera SLAM systems, also known as monocular SLAM systems, it is recognized that the scale of the 3D model may not be determined without further input. Some monocular SLAM systems utilize images of reference objects of known size in order to determine the scale. However, these systems may not be useful in environments where the reference objects are not available or convenient. Embodiments described herein can provide solutions to the determination of scale for monocular SLAM systems without relying on reference objects of known size. In some embodiments of the inventive concepts, a good approximation of the scale may be obtained by using information from an auto focus actuator, i.e. the distance to the current focus plane and use statistical methods on a series of camera frames with different focus distances to calculate the scale.

FIG. 1 is a perspective view of a device performing a simultaneous localization and mapping (SLAM) operation in an environment including a three-dimensional (3D) object, according to some embodiments of the inventive concepts.

Referring to FIG. 1, a SLAM device 14 may be in an environment 10 that includes a physical three-dimensional (3D) object 12. The operations to perform a SLAM operation in the environment 10 may include utilizing the SLAM device 14 to obtain/capture a plurality of images 16a-16d of the object 12 at different points of perspective around the object 12, as shown. Customarily, this scan 10 may include moving the SLAM device 14 in a closed-loop around the object 12. The plurality of images 16a-16d may be obtained/captured with the SLAM device 14 at respective distances 18a-18d from the object.

In some embodiments, the SLAM device 14 may possess both image capture capability and substantial post capture image processing capability. For example, in some embodiments, the SLAM device 14 may be a handheld device containing digital camera components embodied within a camera body. The SLAM device 14 may be embodied as a cellular device (e.g., smart phone) including a camera, a processor, and memory. Alternatively, in some embodiments, the SLAM device 14 may be embodied as a plurality of discrete devices that perform respective image capture and image processing operations, which may be physically and/or temporally spaced apart.

A SLAM operation may include the construction or updating of a digital 3D model of the environment 10 including the object 12 while simultaneously tracking the location, or pose, of the SLAM device 14 within the environment 10. The digital 3D model may be a virtual representation of the environment 10 including the object 12. The digital 3D model may be stored in a memory (e.g., the memory 430 of FIG. 4). The 3D model of the environment 10 may include a scale that may be initially unknown. For example, the 3D model of the environment 10 may include distances and sizes that are measured in units of the 3D model. The scale of the 3D model may be a relationship between the units of the 3D model and units of actual distances and sizes, such as inches or millimeters. The scale of the 3D model may initially not be known. Embodiments of the inventive concepts may include operations to determine the scale of the 3D model, as will be described in more detail below.

Figure 2:
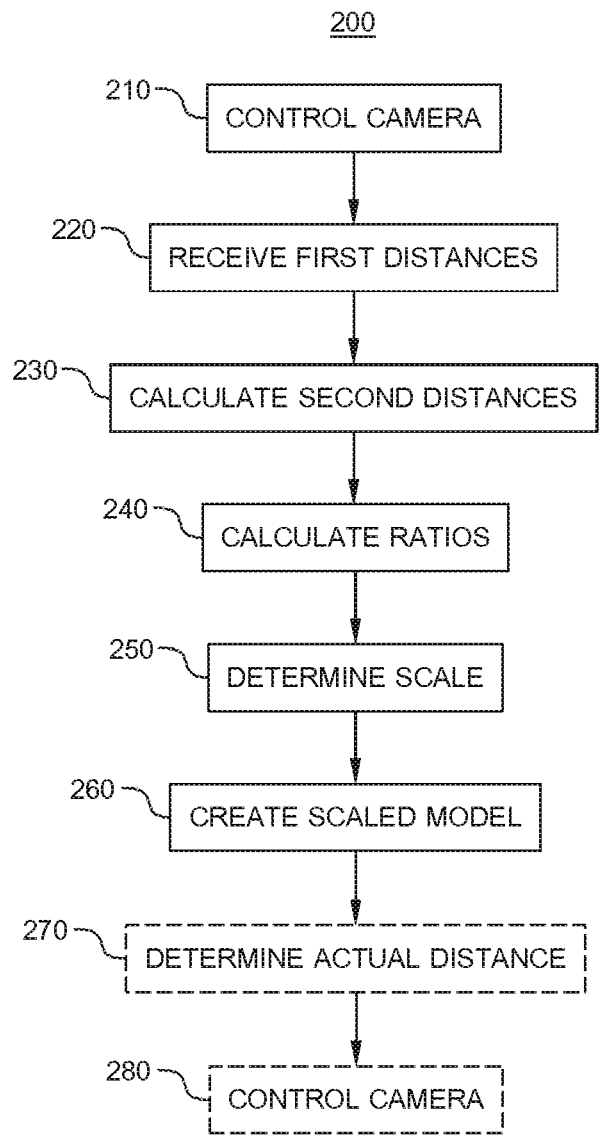
FIG. 2 is a flowchart illustrating operations of methods of determining a scale for a digital 3D model, according to some embodiments of the inventive concepts.

FIG. 2 is a flowchart illustrating operations of methods of determining a scale for a digital 3D model, according to some embodiments of the inventive concepts.

Referring to FIGS. 1 and 2, a SLAM device 14 may determine a scale for a digital 3D model. Operations 200 of a method for determining the scale for a digital 3D model may include controlling 210 a camera (e.g., a camera 410 of FIG. 4) to produce the plurality of images 16a-16d of the environment 10 comprising the object 12. For example, controlling 210 the camera may include performing an image scan of the object 12 utilizing the camera to obtain/capture the plurality of images 16a-16d of the object 12 at different points of perspective around the object 12.

In some embodiments, controlling 210 the camera may include obtaining/capturing the plurality of images 16a-16d with a fixed duration of time between ones of the plurality of images 16a-16d. However, embodiments are not limited thereto. In some embodiments, the plurality of images 16a-16d may be obtained/captured at irregular intervals. For example, ones the plurality of images 16a-16d may be obtained/captured based on a manual shutter, based on detection of motion, or based on another trigger.

In some embodiments, the controlling 210 of the camera may include using an autofocus algorithm to control a focus of the camera. However, embodiments are not limited thereto. In some embodiments, the camera may include a fixed focus or a manually controlled focus. In some embodiments including an autofocus algorithm, the autofocus algorithm may determine a plurality of focus distances, including a respective focus distance for each of the plurality of images 16a-16d. The focus distance may be a distance away from the camera to a focus plane at which the respective image 16a-16d will appear to be in focus. For example, the camera may be focused on the object 12 within the environment 10 and the focus distance may correspond to a distance between the SLAM device 14 and the object 12.

In some embodiments, the controlling 210 of the camera may include determining that at least a predetermined number of the plurality of images are acceptable and excluding images from the plurality of images that are not acceptable. Some of the plurality of images 16a-16d may be determined to not be acceptable. For example, an image 16a-16d may be out of focus, may include motion blur, or may be over or under exposed. An image 16a-16d may be more useful for determining the scale of the 3D model when the SLAM device 14 may determine both the location of the object 12 and the location of the SLAM device 14 within the environment 10. Accordingly, an image 16a-16d may be determined to be acceptable based on a determination that a location of the camera may be calculated or may be determined to be unacceptable based on a determination that the location of the camera may not be calculated. An image 16a-16d may be determined to be acceptable based on a determination that the object is within a view of the respective image 16a-16d or may be determined to be unacceptable based on a determination the object is not within the view of the respective image 16a-16d. An image 16a-16d may be determined to be acceptable based on a determination that a difference between the location of the camera for the respective image 16a-16d and a location of the camera for a previous acceptable image 16a-16d is greater than a threshold or may be determined to be unacceptable based on a determination that the difference between the location of the camera for the respective image 16a-16d and the location of the camera for the previous acceptable image 16a-16d is less than the threshold. Embodiments are not limited thereto and other criteria may be used to determine whether a respective image 16a-16d is acceptable. In some embodiments, a SLAM operation may require at least a predetermined number of acceptable images 16a-16d to determine a scale for a digital 3D model.

The operations 200 may include receiving 220, corresponding to the plurality of images 16a-16d, a respective plurality of first distances 18a-18d between the camera and the object 12 in the environment 10. The plurality of first distances 18a-18d may correspond to the actual distances 18a-18d between the camera and the object 12. In other words, the plurality of first distances 18a-18d may correspond to the actual distances 18a-18d between the SLAM device 14 and the object 12. In some embodiments, the plurality of first distances 18a-18d may correspond to a plurality of focus distances of the camera. For example, in some embodiments where the camera is controlled 210 to use the autofocus algorithm, the autofocus algorithm may provide a respective focus distance for each of the plurality of images 16a-16d. The plurality of first distances 18a-18d may be received from the autofocus algorithm or may be determined based on information received from the autofocus algorithm.

However, embodiments are not limited thereto and, in some embodiments, the plurality of first distances 18a-18d may not correspond to focus distances.

In some embodiments, the SLAM device 14 may include a sensor that measures the first distances 18a-18d. For example, the SLAM device 14 may include a Time of Flight (TOF) sensor (e.g., a sensor 450 of FIG. 4). The TOF sensor may transmit a signal and measure an amount of time for the signal to bounce off the object 12 and be received back at the TOF sensor. The signal may be, for example, an electromagnetic, sound, or light signal. The first distances 18a-18d may be determined based on the measured round-trip time of the signal. The plurality of first distances 18a-18d may be received from the sensor or may be determined based on information received from the sensor.

The operations 200 may include calculating 230, for the plurality of images 16a-16d, using a SLAM algorithm, a plurality of second distances between the camera and the object 12 in the 3D model of the environment 10. The second distances may correspond to distances in the 3D model and may be measured in units of the 3D model. The SLAM algorithm may construct or update the 3D model of the environment 10 including the object 12 while simultaneously tracking the location, or pose, of the camera within the environment 10. In other words, the SLAM algorithm may determine locations of the camera for each of the images 16a-16d in the 3D model and may determine a location of the object 12 in the 3D model. Accordingly, information from the SLAM algorithm may be used to calculate respective second distances, in units of the 3D model, between the camera and the object 12 in the 3D model.

The operations 200 may include calculating 240 a plurality of ratios corresponding to the plurality of images 16a-16d based on respective ones of the plurality of first distances 18a-18d and respective ones of the second distances. In other words, for each of the plurality of images 16a-16d there is a respective first distance 18a-18d, which is measured in actual distance units, between the camera and the object 12 and a respective second distance, which is measured in units of the 3D model, between the camera and the object 12. For each of the plurality of images 16a-16d, a ratio may be calculated corresponding to a ratio of the actual distance units to the units of the 3D model. In some embodiments, the ratios may be calculated for only some of the images 16a-16d. For example, in some embodiments, the ratios may be calculated only for the ones of the images 16a-16d that are determined to be acceptable.

The operations 200 may include determining 250 a scale of the 3D model based on the plurality of ratios. For example, the scale of the 3D model may be determined by calculating an average of the plurality of ratios or, in some embodiments, the ones of the plurality of ratios that correspond to ones of the images 16a-16d that are determined to be acceptable. As the first distances 18a-18d and the second distances are each based upon measurements that may include some amount of inaccuracy, each of the calculated ratios may not be identical. In some embodiments, the scale of the 3D model may be determined based on the average of the ratios. For example, the scale of the 3D model may be the average of the ratios.

Figure 3:
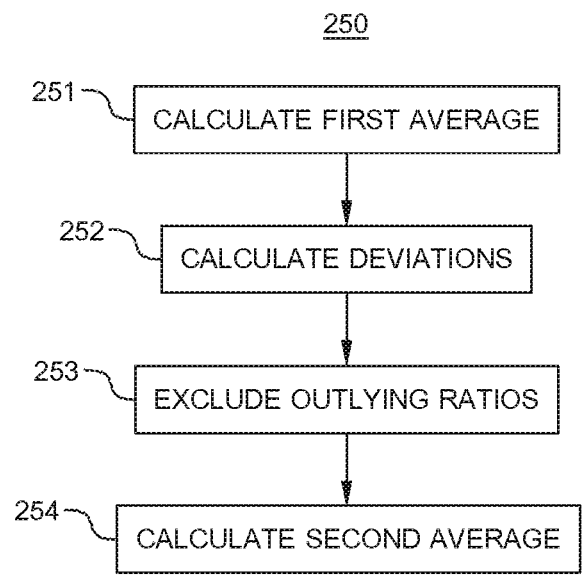
FIG. 3 is a flowchart illustrating scale determination operations of the methods of FIG. 2, according to some embodiments of the inventive concepts.

FIG. 3 is a flowchart illustrating scale determination operations of the methods of FIG. 2, according to some embodiments of the inventive concepts.

Referring to FIGS. 1-3, in some embodiments, the determining 250 of the scale may include statistical analysis of the ratios. For example, some of the plurality of ratios may be determined to be outliers and may be excluded. For example, calculating the average of the plurality of ratios may include calculating 251 a first average of the plurality of ratios. The determining 250 of the scale may further include calculating 252 a deviation from the first average for each of the ones of the plurality of ratios that were used to determine the first average. Outlying ones of the plurality of ratios with a deviation from the first average that is greater than a threshold value may be excluded 253. In some embodiments, the threshold value is a predetermined multiple of a standard deviation of the plurality of ratios. For example, all ratios that deviate more than three times the standard deviation may be ignored. A second average may then be calculated 254 of ones of the plurality of ratios with a deviation from the first average that is less than the threshold value. In other words, only ones of the plurality of ratios that are close to the first average may be used to calculate the second average of ratios. In some embodiments, the scale of the 3D model may be determined based on the second average of the ratios. For example, the scale of the 3D model may be the second average of the ratios.

Referring again to FIGS. 1-2, the operations 200 may include creating 260 a scaled digital 3D model based on the 3D model and the determined scale of the 3D model. The scaled digital 3D model may be a virtual representation of the environment 10 including the object 12 wherein distances and sizes in the scaled 3D model correspond to actual distances and sizes of the environment 10 in actual distance units. For example, distances in the 3D model may be multiplied or divided by the determined scale of the 3D model to calculate the actual distances of the environment 10 for the scaled 3D model.

In some embodiments, the operations 200 may include determining 270 an actual distance between the camera and the object 12 and controlling 280 the camera to produce at least one second image using the actual distance to control a focus of the camera. The actual distance may be determined based on the scaled 3D model and based on a determined location of the camera. The location of the camera may be determined using the SLAM algorithm. In some embodiments, the location of the camera may be determined based on a location of the camera in a previous image or may be predicted based on a determined motion of the camera. The motion of the camera may be inferred, for example, from the location of the camera in a plurality of previous frames or, in some embodiments, may be based on measurements from a motion sensor.

In some 3D scanning systems, it may be desirable to maintain a focus of the camera on the object 12 that is being scanned. A focus that is based on the actual distance from the camera to the object 12, as determined based on the scaled 3D model, may maintain focus better than an autofocus algorithm. For example, for some images, the autofocus algorithm may focus on another object or may focus on a background of the environment 10, whereas a focus based on the actual distance to the object 12 may be locked on the object 12.

Figure 4:
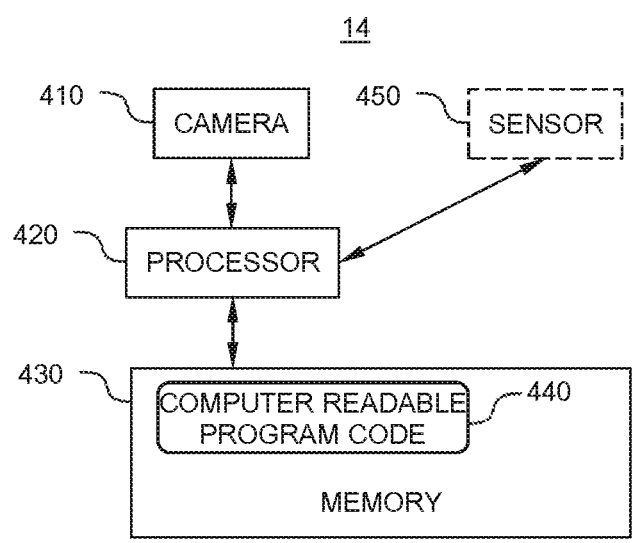
FIG. 4 is a block diagram schematically illustrating a SLAM device according to some embodiments of the inventive concepts.

FIG. 4 is a block diagram schematically illustrating a SLAM device according to some embodiments of the inventive concepts.

Referring to FIG. 4, the SLAM device 14 may include a camera 410, a processor, 420, and a memory 430 including computer readable program code 440. The SLAM device 14 may correspond to the SLAM device 14 of FIG. 1. In some embodiments, the SLAM device 14 may be a handheld device containing digital camera components embodied within a camera body, may be a cellular communication device, such as a smartphone, or may be another type of device that may be moved within the environment 10 to capture the images 16a-16d. The camera 410 may be coupled to the processor 420 by a communications bus. In some embodiments, the camera 410 may be external to a device including the processor 420 and may be connected to the processor 420 via a cable or wireless interface. The communications bus may be used by the processor 420 to control the camera 410 and to receive the images 16a-16d and/or first distances 18a-18d from the camera.

The processor 420 may include one or more data processing circuits, such as a general purpose and/or special purpose processor, e.g., microprocessor and/or digital signal processor, that may be collocated or distributed across one or more networks. The processor 420 may be configured to execute the computer readable program code 440 in the memory 430 to perform at least some of the operations and methods of described herein as being performed by the SLAM device 14.

The memory 430 may include a non-transitory computer readable storage medium having computer readable program code 440 embodied in the medium. In some embodiments, a computer program product may include the non-transitory computer readable storage medium 430 having the computer readable program code 440 embodied in the medium 430.

In some embodiments, the SLAM device 14 may include one or more additional circuits, such as a TOF sensor 450, that are coupled to the processor 420.

Figure 5:
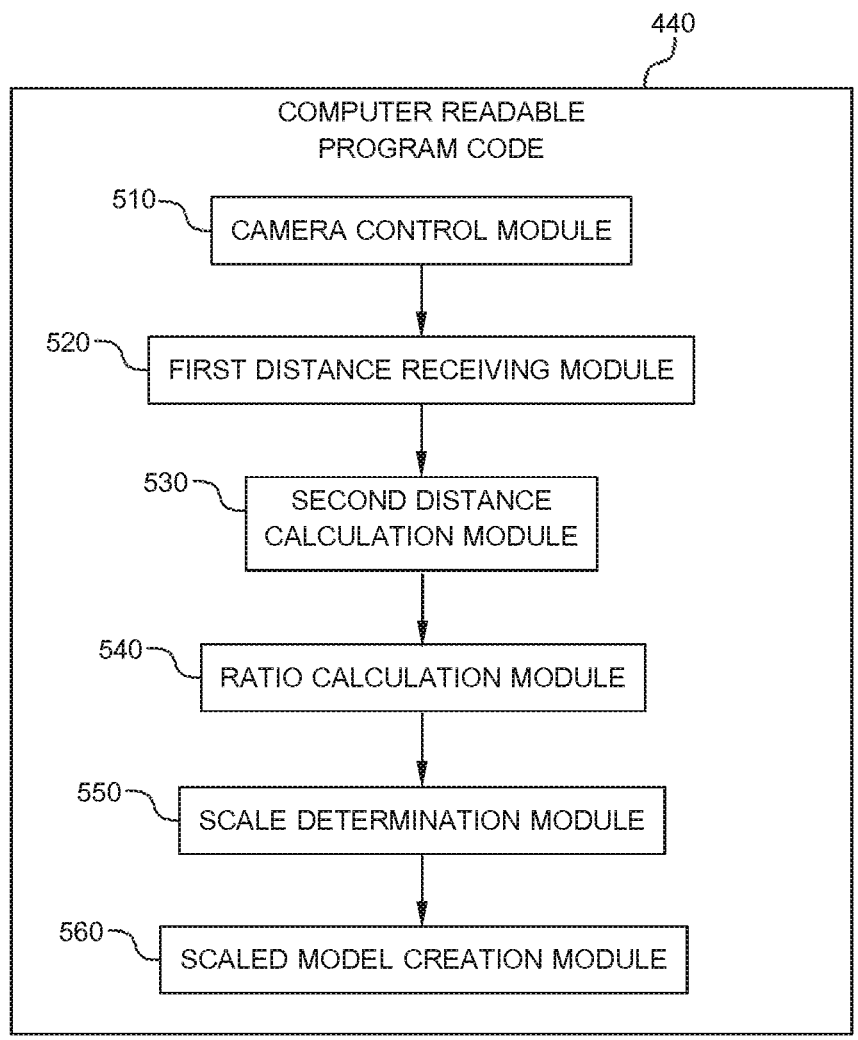
FIG. 5 is a flowchart illustrating the computer readable program code of FIG. 4, according to some embodiments of the inventive concepts.

FIG. 5 is a flowchart illustrating the computer readable program code of FIG. 4, according to some embodiments of the inventive concepts.

Referring to FIGS. 4-5, the computer readable program code 440 may include modules for the SLAM device 14 that perform operations as disclosed herein according to some embodiments. The computer readable program code 440 of FIG. 5 may include one or more modules. The computer readable program code 440 may include a camera control module 510, a first distance receiving module 520, a second distance calculation module 530, a ratio calculation module 540, a scale determination module 550, and/or a scaled model creation module 560. The camera control module 510 may perform the camera control operations 210 and/or 280 of FIG. 2. The first distance receiving module 520 may perform the receiving of the first distances operation 220 of FIG. 2. The second distance calculation module 530 may perform the second distance calculation operation 230 of FIG. 2. The ratio calculation module 540 may perform the calculating of the ratios operation 240 of FIG. 2. The scale determination module 550 may perform the scale determination operation 250 of FIG. 2 and/or the scale determination operations 251-254 of FIG. 3. The scaled model creation module 560 may perform the creating of the scaled model operation 260 of FIG. 2. The modules 510-560 may perform other corresponding operations and methods disclosed herein and/or the computer readable program code 440 may include additional modules.

Various embodiments presented herein have described improved methods for determining the scale of 3D models. Specifically, solutions to determine the scale of 3D models without requiring targets of known size and/or a plurality of cameras have been provided by techniques described herein. This may be achieved using ratios calculated based on first distances that are in actual distance units and second distances that are in units of the 3D model. The determined scale of a 3D model may be used, for example, to control a focus of a camera to maintain focus on an object with better control than an autofocus algorithm.

In some embodiments, a single camera may be used for 3D scanning and/or creating a 3D object. As discussed above, generally single camera systems lack the ability to know the current scale, i.e. the distance to or the actual size of the object, without using target objects of known size. When using a stereo camera solution this is no problem, since the baseline (i.e. the distance) between the cameras may be known and may be used to calculate the scale. A good approximation of the scale may be obtained by using information from an auto focus actuator, i.e. the distance to the current focus plane and statistical methods may be used on a series of camera frames with different focus distances to calculate the scale.

When starting scanning, the focusing of the camera may be controlled using normal auto focusing algorithms. The camera may provide a corresponding distance to the focus plane with the camera frames. In some embodiments, the focusing distance for a single frame may not be precise enough to provide a sufficient estimation of the scale. Statistical methods may be used on a series of frames with different focusing distances to determine a better approximation of the scale.

A SLAM algorithm may provide a dummy distance to the object. The scale of the 3D model may be a ratio between this dummy distance and the focusing distance. The mean and standard deviation of this ratio may be collected using a series of camera frames. The ratios that deviate too much from the mean value is then filtered away. For example, all ratios that deviate more than three times the standard deviation may be ignored. A new mean value of the ratios may be calculated of the remaining ratios to provide a better approximation of the actual scale.

After calculating the scale, the calculated scale information may be used to control the focusing of the camera. In other words, a focus actuator of the camera may be controlled to focus by the distance calculated to the object with help of the scale instead of using the normal auto focusing algorithms. This may provide a better control of the camera focusing and may provide a focus that remains on the object and may not suddenly change because the cameras focusing algorithm suddenly have problems finding correct focus on the object.

In some embodiments, the scale may be determined using a Time Of Flight (TOF) sensor in parallel with the camera. The TOF sensor may provide a distance to the object with a better precision than an auto focus actuator.

Some embodiments have been disclosed herein, in connection with the above description and the drawings. It will be understood that it would be unduly repetitious and obfuscating to literally describe and illustrate every combination and sub combination of these embodiments. Accordingly, the present specification, including the drawings, shall be construed to constitute a complete written description of some combinations and sub combinations of embodiments and of the manner and process of making and using them, and shall support claims to any such combination or sub combination. Many variations and modifications can be made to the embodiments without substantially departing from the inventive concepts. All such variations and modifications are intended to be included herein within the scope of the inventive concepts.

What is claimed is:

1. A device comprising:
   a camera;
   a processor; and
   a non-volatile memory coupled to the processor and comprising computer readable program code that when executed by the processor causes the processor to perform operations comprising:
      receiving, corresponding to a plurality of images of an environment comprising an object, a respective plurality of first distances between the camera and the object in the environment;
      calculating, for the plurality of images, using a simultaneous localization and mapping (SLAM) algorithm, a plurality of second distances between the camera and the object in a digital 3-Dimensional (3D) model of the environment;
      calculating a plurality of ratios corresponding to the plurality of images based on respective ones of the plurality of first distances and respective ones of the second distances;
      determining a scale of the 3D model based on the plurality of ratios; and
      creating a scaled digital 3D model based on the 3D model and the determined scale of the 3D model, wherein distances and sizes in the scaled 3D model correspond to actual distances and sizes of the environment, wherein the operations further comprise controlling the camera to produce the plurality of images of the environment comprising the object using an autofocus algorithm to control a focus of the camera, and wherein the receiving of the plurality of first distances comprises receiving a plurality of focus distances from the autofocus algorithm.

2. The device of claim 1, wherein the plurality of images is a first plurality of images, and wherein the operations further comprise:
 determining an actual distance from the camera to the object based on the scaled 3D model; and
 controlling the camera to produce a second image using the actual distance to control a focus of the camera.

3. The device of claim 1, wherein the operations further comprise determining that at least a predetermined number of the plurality of images are acceptable and excluding images from the plurality of images that are not acceptable, and wherein the at least a predetermined number of the plurality of images are determined to be acceptable based on at least one of:
 a determination that a location of the camera may be calculated;
 a determination that the object is within a view of each of the at least a predetermined number of the plurality images; and/or
 a determination that a difference between the location of the camera for ones of the at least a predetermined number of the plurality of images and a location of the camera for a previous acceptable image is greater than a threshold.

4. The device of claim 1, wherein the determining of the scale of the 3D model comprises calculating an average of the plurality of ratios.

5. The device of claim 4, wherein the calculating of the average of the plurality of ratios comprises:
 calculating a first average of the plurality of ratios;
 calculating a deviation from the first average for each of the plurality of ratios; and
 calculating a second average of ones of the plurality of ratios with that deviate from the first average by less than a threshold value.

6. The device of claim 5, wherein the threshold value is a predetermined multiple of a standard deviation of the plurality of ratios.

7. A method comprising:
 receiving, corresponding to a plurality of images of an environment comprising an object, a respective plurality of first distances between the object in the environment and a camera that was used for capturing the plurality of images;
 calculating, for the plurality of images, using a simultaneous localization and mapping (SLAM) algorithm, a plurality of second distances between the camera and the object in a digital 3-Dimensional (3D) model of the environment;
 calculating a plurality of ratios corresponding to the plurality of images based on respective ones of the plurality of first distances and respective ones of the second distances;
 determining a scale of the 3D model based on the plurality of ratios;

creating a scaled digital 3D model based on the 3D model and the determined scale of the 3D model, wherein distances and sizes in the scaled 3D model correspond to actual distances and sizes of the environment; and controlling the camera to produce the plurality of images of the environment comprising the object using an autofocus algorithm to control a focus of the camera, wherein the receiving of the plurality of first distances comprises receiving a plurality of focus distances from the autofocus algorithm.

8. The method of claim 7, wherein the plurality of images is a first plurality of images, and the method further comprising:
 determining an actual distance from the camera to the object based on the scaled 3D model; and
 controlling the camera to produce a second image using the actual distance to control a focus of the camera.

9. The method of claim 7, the method further comprising:
 determining that at least a predetermined number of the plurality of images are acceptable and excluding images from the plurality of images that are not acceptable, wherein the at least a predetermined number of the plurality of images are determined to be acceptable based on at least one of:
 a determination that a location of the camera may be calculated;
 a determination that the object is within a view of each of the at least a predetermined number of the plurality images; and/or
 a determination that a difference between the location of the camera for ones of the at least a predetermined number of the plurality of images and a location of the camera for a previous acceptable image is greater than a threshold.

10. The method of claim 7, wherein the determining of the scale of the 3D model comprises calculating an average of the plurality of ratios.

11. The method of claim 10, wherein the calculating of the average of the plurality of ratios comprises:
 calculating a first average of the plurality of ratios;
 calculating a deviation from the first average for each of the plurality of ratios; and
 calculating a second average of ones of the plurality of ratios that deviate from the first average by less than a threshold value.

12. The method of claim 11, wherein the threshold value is a predetermined multiple of a standard deviation of the plurality of ratios.

13. A computer program product, the computer program product comprising a non-transitory computer readable storage medium having computer readable program code embodied in the medium that when executed by a processor causes the processor to perform the operations of the method of claim 7.

14. The computer program product of claim 13, wherein the plurality of images is a first plurality of images, and wherein the operations further comprise:
 determining an actual distance from the camera to the object based on the scaled 3D model; and
 controlling the camera to produce a second image using the actual distance to control a focus of the camera.

15. The computer program product of claim 13, wherein the determining of the scale of the 3D model comprises:
 calculating a first average of the plurality of ratios;

calculating a deviation from the first average for each of the plurality of ratios; and calculating a second average of ones of the plurality of ratios with that deviate from the first average by less than a threshold value.

\* \* \* \* \*